(12) United States Patent
Jones

(10) Patent No.: US 8,234,237 B2
(45) Date of Patent: Jul. 31, 2012

(54) SYSTEM AND METHOD FOR AUTOMATIC RETURN LETTER GENERATION

(75) Inventor: Christopher Lee Jones, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 622 days.

(21) Appl. No.: 12/467,641

(22) Filed: May 18, 2009

(65) Prior Publication Data
US 2010/0293133 A1 Nov. 18, 2010

(51) Int. Cl.
G06F 17/00 (2006.01)
G06N 7/04 (2006.01)

(52) U.S. Cl. ............................................. 706/54
(58) Field of Classification Search ............... 706/54
See application file for complete search history.

(56) References Cited

U.S. PATENT DOCUMENTS
5,161,214 A 11/1992 Addink et al.
6,912,297 B2 6/2005 Scott et al.
2008/0123133 A1* 5/2008 Oi ................................ 358/1.15

OTHER PUBLICATIONS

"Nationwide Insurance Document Processing", http://www.datacap.com/news/cases/nationwide/, May 18, 2009.

* cited by examiner

*Primary Examiner* — Michael B Holmes
(74) *Attorney, Agent, or Firm* — Fox Rothschild LLP

(57) ABSTRACT

Systems and methods for automatically generating a return letter are disclosed. The system may include a computer usable medium in communication with a processor. The processor may determine whether a source document with contact information includes one or more fields requiring data. In response to the determining, a response document based on the required data may be automatically generated. A document identifier based on the contact information and the response document may be automatically generated. The response document may be transmitted to a recipient based on the contact information. In response to receiving response data from the recipient, the response data may be matched with the source document using the document identifier. The response data may be electronically merged with the source document to yield a merged document.

20 Claims, 4 Drawing Sheets

SYSTEM AND METHOD FOR AUTOMATIC RETURN LETTER GENERATION

BACKGROUND

The disclosed embodiments relate generally to methods and systems for automatic document generation, and more particularly to return letter generation.

Each day businesses receive thousands of pages of documents. These documents could include claim forms for insurance providers, lending documents for banks or mortgage applications for mortgage companies. Each of those documents include required information that must be reviewed. The required information is data which must be received in order to process the document. For example, a healthcare provider could receive thousands of claim forms to process. In order for the claim form to be processed, information such as the patient's name, billing identification code, date of birth, home address and a doctor's code must be included on a claim form. If any of this information is excluded, the document cannot be properly processed.

In current document processing systems, all the received documents are sent to be processed by machines which are part of a workflow system. For example, data, such as a credit score, may be analyzed to determine if a mortgage application request should be granted. A workflow system includes one or more computers which retrieve and analyze information from a document if all the necessary information is provided. If the document does not contain all the required information, the document must be manually sent back to the customer. The customer then fills out the required information and sends back the document. Once the customer returns the document with all required information, processing of the document is reinitiated.

SUMMARY

In an embodiment, a computer program product may include a computer usable medium having a computer readable program code embodied therein. The computer readable program code is adapted to be executed to implement a method of automatically generating a return letter. The code, when executed, may determine whether a source document with contact information includes one or more fields requiring data. In response to the determining, a response document based on the required data may be automatically generated. A document identifier based on the contact information and the response document may be automatically generated. The response document may be transmitted to a recipient based on the contact information. In response to receiving response data from the recipient, the response data may be matched with the source document using the document identifier. The response data may be electronically merged with the source document to yield a merged document.

In an embodiment, a system for automatic return letter generation may include a processor and computer-readable storage medium in communication with the processor. The computer-readable storage medium may contain one or more programming instructions that instruct the processor to determine whether a source document with contact information includes one or more fields requiring data. In response to the determining, a response document may be automatically generated based on the required data. A document identifier based on the contact information and the response document may be automatically generated. The response document may be transmitted to a recipient based on the contact information. In response to receiving response data from the recipient, the response data may be matched with the source document using the document identifier. The response data may be electronically merged with the source document to yield a merged document.

BRIEF DESCRIPTION OF THE DRAWINGS

Aspects, features, benefits and advantages of the embodiments described herein will be apparent with regard to the following description, appended claims, and accompanying drawings where:

DETAILED DESCRIPTION

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

As used herein and in the appended claims, the singular forms "a," "an," and "the" include the plural reference unless the context clearly dictates otherwise. Thus, for example, reference to a "document" is a reference to one or more documents and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

A "computing device" refers to a device that execute instructions and processes data in order to perform one or more functions. A computing device may include any processor-based device such as, for example, a server, a personal computer, a personal digital assistant, a web-enabled phone, a smart terminal, a dumb terminal and/or other electronic device capable of communicating in a networked environment.

A "printing device" is an electronic device that is capable of receiving commands, printing text and/or images on a substrate, and/or scanning a document. Printing devices may include, but are not limited to, network printers, production printers, copiers and other devices using ink or toner, and scanners. Printing devices may also perform a combination of functions such as printing/scanning, in which case such devices may be considered to be multifunctional devices.

A "knowledge base" is an electronic repository of searchable data. A knowledge base may refer to a software component, such as, but not limited to, a database or a table. Alternatively, a knowledge base may refer to a hardware component, such as, but not limited to, a tangible storage medium.

Figure 1:
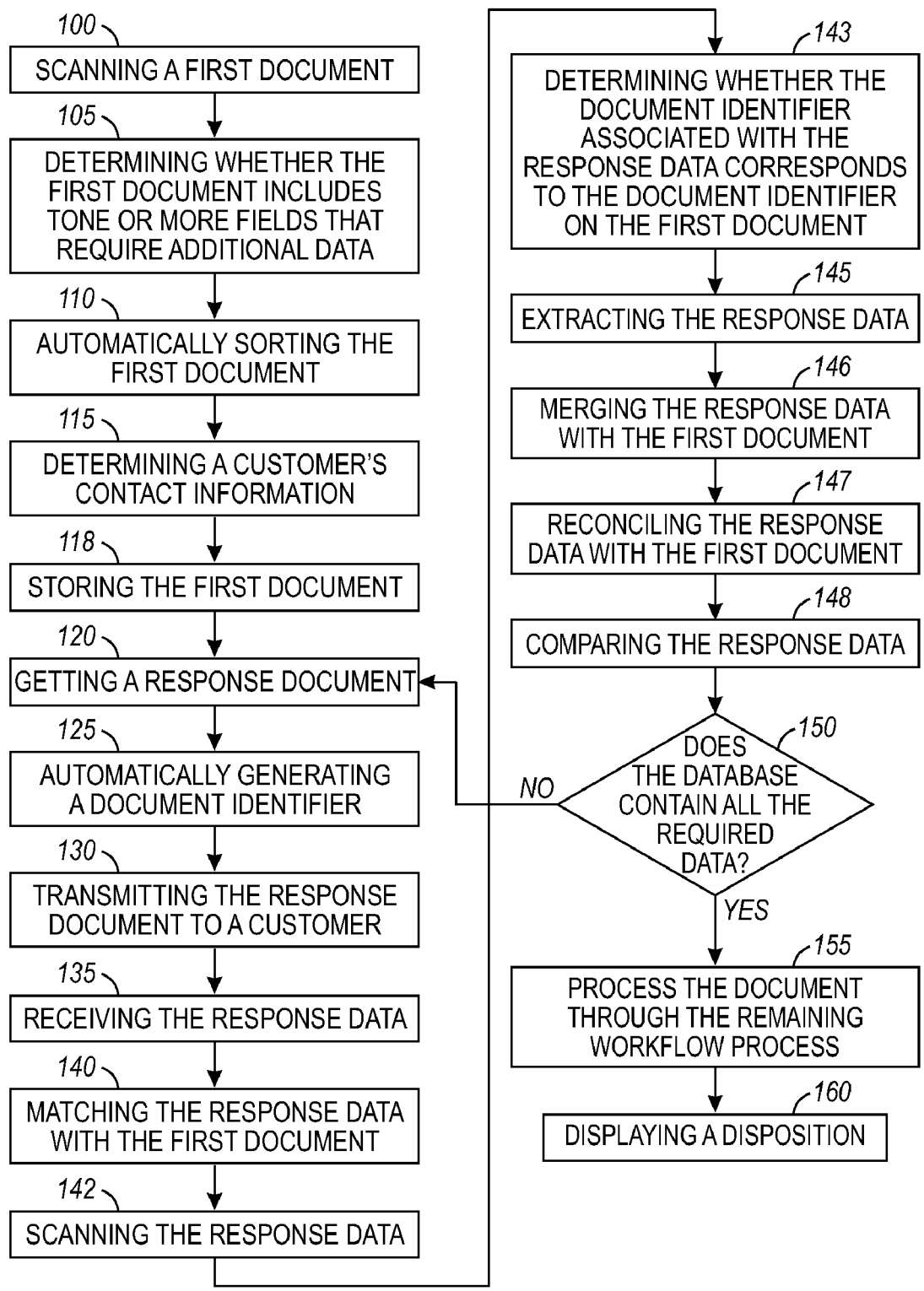
FIG. 1 discloses a flow diagram of an exemplary method for automatic return letter generation according to an embodiment.

FIG. 1 discloses a flow diagram of an exemplary method for automatic return letter generation according to an embodiment. In an embodiment, a document processing center may engage in a set of activities that may be performed as part of a workflow process. To begin the workflow process, an initial document may be prepared for scanning. In an embodiment, a document may be a data file representing information that may be displayed on a display device and/or printed. In an embodiment, a document may be a paper document that is extracted from its envelope before processing. In an embodiment, if the document is not received electronically, each initial document may be scanned 100. The data may be scanned using techniques such as, but not limited to, optical character recognition and/or metadata extraction.

During and/or after the scan, it may be determined 105 whether the first document includes one or more fields that require additional data. In an embodiment, additional data may be required if data is missing and/or invalid. Data may include, without limitation, one or more numbers, characters and/or symbols. In an embodiment, specific fields may be scanned to determine whether the initial document includes all required information. For example, an initial document may be scanned to determine whether it includes certain required fields, such as, without limitation, a name, a mailing address, a telephone number, an e-mail address, a credit card number, an insurance identification code, an insurance group number and/or an identification number. In an embodiment, some combination of the data in these fields may be required. The required fields may be necessary for the document to be processed. In an embodiment, data may be missing from one or more of the required fields. For example, a patient's insurance identification code may be missing. In an embodiment, the document may be a print request and the number of copies requested for printing may be missing. In an embodiment, one or more of the required fields may have missing or invalid data. For example, an e-mail address may be missing an "@" sign.

If one or more fields of the initial document require additional data, the initial document may be automatically sorted 110 so that the document is removed from processing. An initial document which does not have acceptable data in the required fields may be automatically separated from the workflow process.

The initial document may be used to automatically determine 115 a manner of communicating with a customer in order to request the additional data, such as by determining a customer's contact information. The contact information may include, without limitation, a customer's mailing address, a customer's email address and/or a customer's facsimile number.

Figure 2:
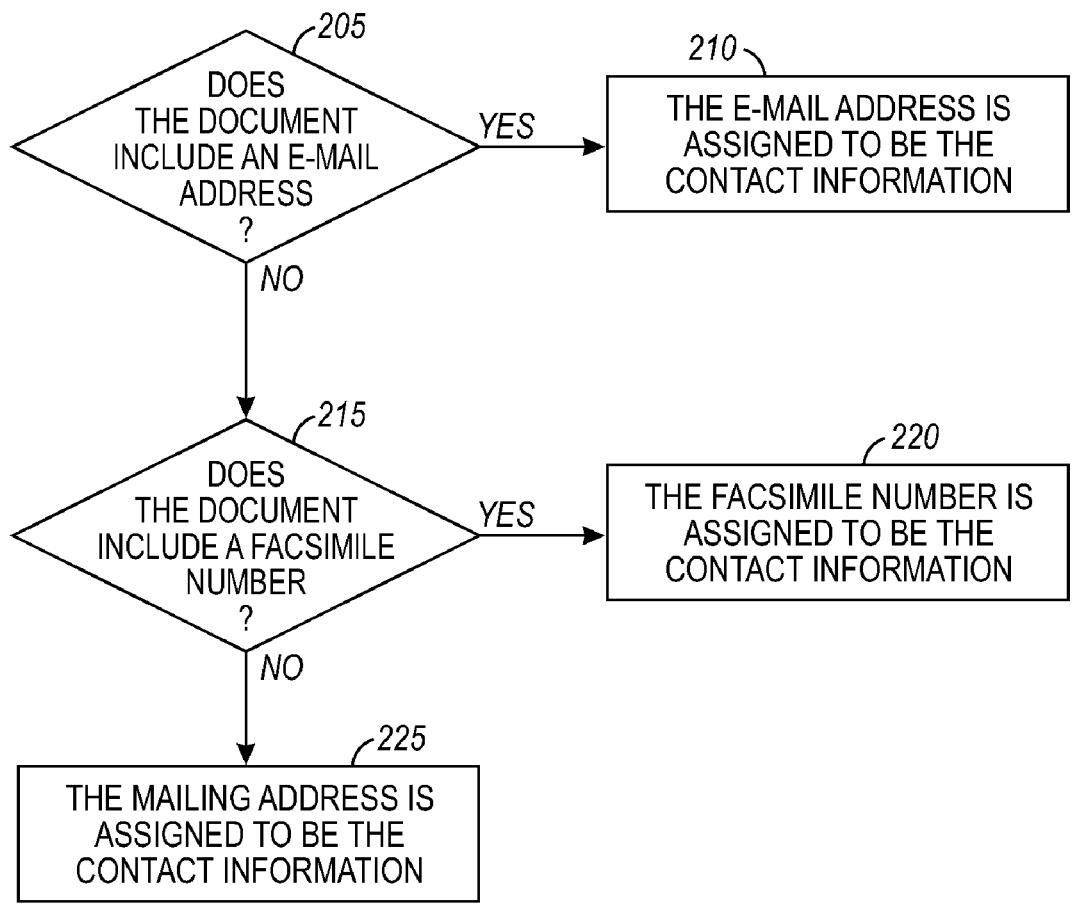
FIG. 2 discloses a flow diagram of an exemplary method for determining contact information according to an embodiment.

FIG. 2 discloses a flow diagram of an exemplary method for determining contact information according to an embodiment. If the first document includes an e-mail address 205, the e-mail address may be assigned 210 to be the contact information. If the first document includes a facsimile number and no e-mail address 215, the facsimile number may be assigned 220 to be the contact information. If the first document includes a mailing address and no facsimile number and no e-mail address, the mailing address may be assigned 225 to be the contact information.

Referring back to FIG. 1, the initial document may be stored 118. In an embodiment, the initial document may be stored 118 in a knowledge base. In an embodiment, the data provided in the initial document may be extracted and stored.

A response document may be generated 120. A response document is a document requesting required data. A response document may include a cover letter describing the required data needed to process the document. In an embodiment, the response document may include a copy of the initial document, a standardized template or a form highlighting the fields requiring the required data. The response document may include, without limitation, a portable document format (PDF) or a word document.

A document identifier may be automatically generated 125. The document identifier may be associated with an initial document to provide each document with a unique form of identification. Types of document identifiers may include, without limitation, barcodes, numbers, letters, symbols, e-mail addresses and/or facsimile numbers. In an embodiment, the initial document may be associated with a document identifier. In an embodiment, the same or a corresponding document identifier associated with the initial document may be generated and associated with the response document.

In an embodiment, the type of document identifier associated with a document may vary based on the customer's contact information. Based on the contact information, a response document may be transmitted to the customer via printing and mailing, faxing or e-mailing. The response document may be placed in a queue to be transmitted to the customer. The queue may be based on the type of contact information.

Figure 3:
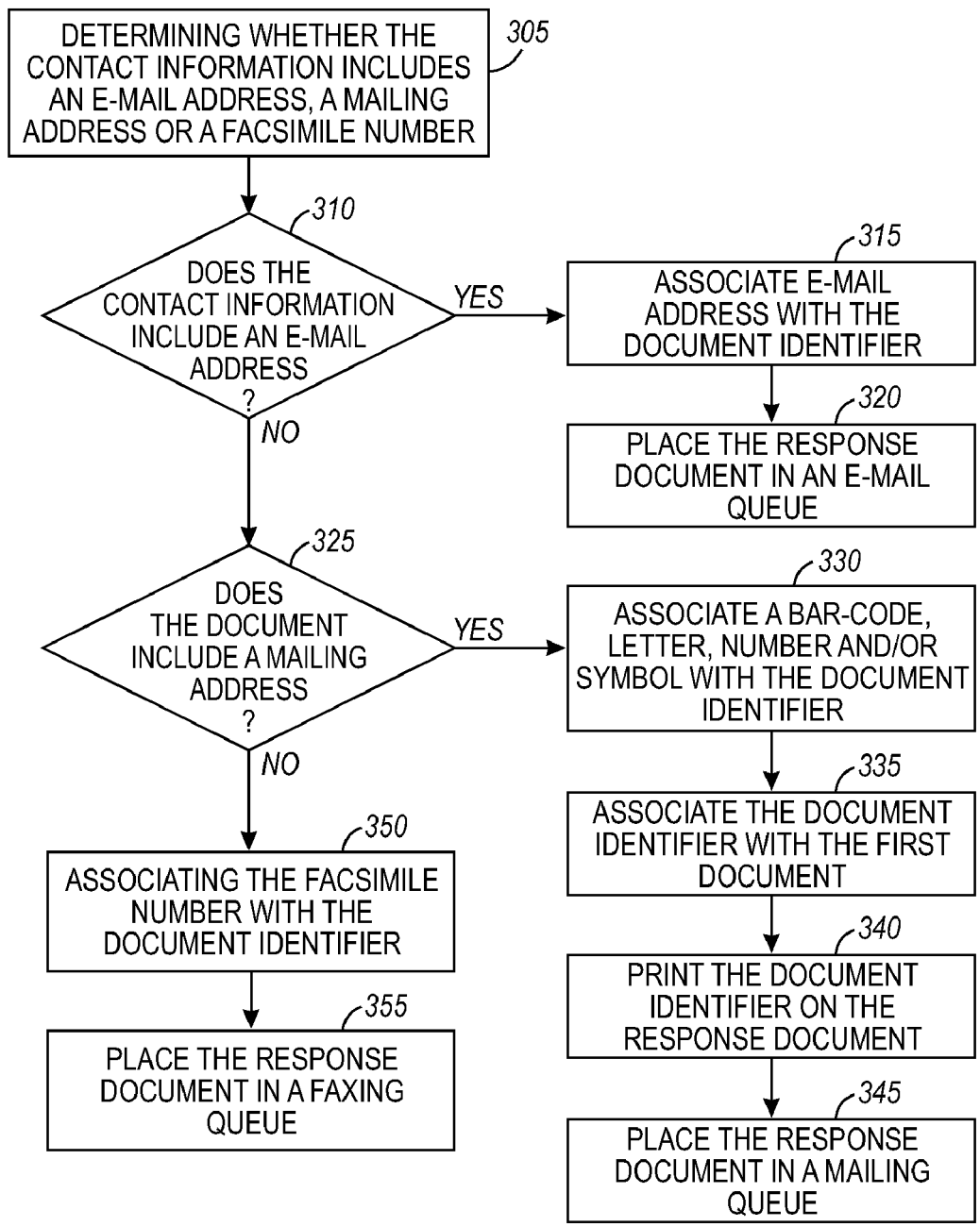
FIG. 3 discloses a flow diagram of an exemplary method for generating a document identifier according to an embodiment.

FIG. 3 discloses a flow diagram of an exemplary method for generating a document identifier according to an embodiment. It may be determined 305 whether the contact information may include, without limitation, a mailing address, an e-mail address and/or a facsimile number. If the contact information includes an e-mail address 310, then the e-mail address may be associated 315 with the document identifier. In an embodiment, the document identifier may include part of or may be associated with the e-mail address. In an embodiment, the e-mail address may be associated with the document identifier via a return e-mail address, a subject line and/or one or more numbers, symbols and/or characters embedded in the response document. The response document may be placed 320 in an e-mail queue.

If the contact information includes a mailing address 325, then a barcode, a letter, a symbol and/or a number may be associated 330 with the document identifier, the document identifier may be associated 335 with the first document, the document identifier may be printed 340 on the response document, and the response document may be placed 345 in a mailing queue. In an embodiment, the document identifier may include a bar code, letter, number and/or symbol which may be associated with both the initial document and the response document.

If the contact information includes a facsimile number, then the facsimile number may be associated 350 with the document identifier. In an embodiment, the document identifier may include part of or may be associated with the facsimile number. In an embodiment, the facsimile number may be associated with the document identifier via a return facsimile number, a subject line and/or one or more numbers, symbols and/or characters embedded in the response document. The response document may be placed 355 in a faxing queue.

Referring back to FIG. 1, the response document may be transmitted 130 to the customer. The customer may supply the response data. Response data is data or information provided by the customer in response to the response document. The response data is used to supply the additional information. The customer may send the response data to the document processing center.

The response data may be received 135 by the document processing center. In an embodiment, the response data may be received, without limitation, via e-mail, facsimile or mail. The response data may be matched 140 with the initial document. In an embodiment, the matching may include scanning 142 the response data to determine the document identifier and determining 143 whether the document identifier associated with the response data corresponds to the document identifier associated with the first document.

In an embodiment, if the response data is e-mailed or faxed, the response data may be electronically matched to the initial document. In an embodiment, the e-mailed or faxed response data may be matched to the initial document by using the document identifier.

If the response data is mailed back to the document processing center, then the response data may be inserted at the beginning of the processing workflow. The response data may be scanned 142 to determine the document identifier. The document identifier associated with the response data may be used to determine 143 whether the document identifier associated with the response data corresponds to the document identifier on the first document.

The response data may be extracted 145. In an embodiment, the response data may be stored in a knowledge base. In an embodiment, the response data may be merged 146 with previously stored data from the initial document. The response data and the previously stored data may be reconciled 147. Reconciliation may include, without limitation, comparing 148 the response data with the one or more fields requiring data.

The document processing center may determine 150 whether the knowledge base contains all required data. If all required data is stored in the knowledge base, then the merged document will be processed 155 through any remaining workflow steps. In an embodiment, if some of the required data is not in the knowledge base, a second response document may be generated 120, and the process may be repeated. The processing may result in a disposition such as an approval, disapproval or a decision to store the merged document in a repository. For example, if the document is an insurance claim form, then once the required data is provided, the data may be reconciled and a disposition may be provided. If the insurance claim form is approved, a customer may be notified that the insurance company was paid. In an embodiment, if the document is a print request, the requested number of pages may be printed.

The disposition of the merged document may be displayed 160. In an embodiment, the disposition of the document may be displayed in an e-mail, a print out or on a monitor. In an embodiment, the disposition of the document may be tracked for record keeping purposes. For example, the document processing system may track the number of initial documents received, the number of response documents sent, the response data received and/or the number of documents merged and/or reconciled. In an embodiment, reconciliation data can be provided based on a date the documents were received. For example, 10,000 documents may be received on a Monday. On that Monday, 9,999 of the documents may be successfully processed. The remaining document may have been sent through the automatic letter generation process because the document was missing required data. Four days later, the response data corresponding to the additional required data may be received. A report may be provided which states that the 10,000 documents received on Monday have been reconciled and processed through the remaining workflow process. In an embodiment, the disposition of the documents may be reported on a yearly, biyearly, monthly, biweekly, weekly or daily basis.

Figure 4:
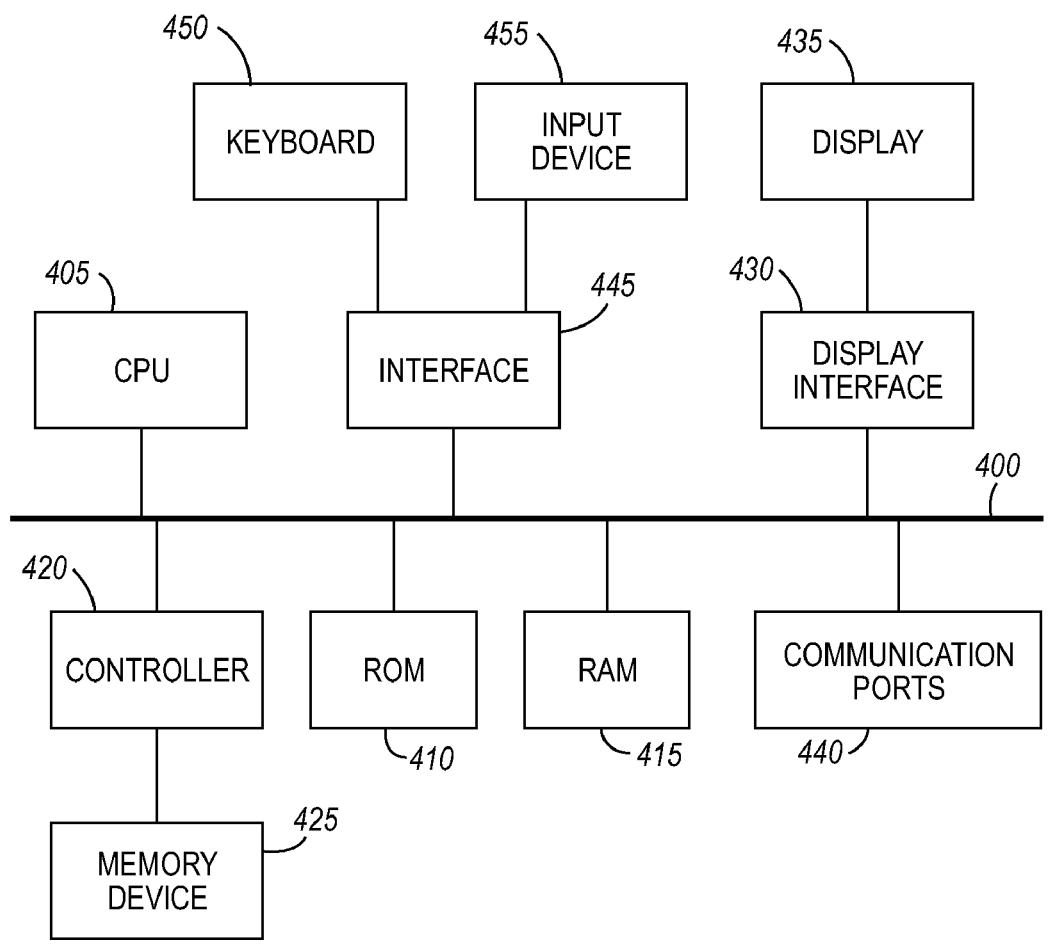
FIG. 4 depicts a block diagram of an exemplary system that may be used to contain or implement program instructions according to an embodiment.

FIG. 4 depicts a block diagram of exemplary internal hardware that may be used to contain or implement program instructions according to an embodiment. A bus 400 serves as the main information highway interconnecting the other illustrated components of the hardware. CPU 405 is the central processing unit of the system, performing calculations and logic A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices.

Program instructions may be stored in the ROM 410 and/or the RAM 415. Optionally, program instructions may be stored on a tangible computer readable medium such as a compact disk, a digital disk, flash memory, a memory card, a USB drive, an optical disc storage medium, such as Blu-Ray™ disc, and/or other recording medium.

An optional display interface 430 may permit information from the bus 400 to be displayed on the display 435 in audio, visual, graphic or alphanumeric format. Communication with external devices may occur using various communication ports 440. An exemplary communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A computer program product, comprising a computer usable medium having a computer readable program code embodied therein, said computer readable program code adapted to be executed to implement a method for automatic return letter generation, the method comprising:

determining whether a source document with contact information includes one or more fields requiring data;

responsive to the determining, automatically generating a response document based on the required data;

automatically generating a document identifier based on the contact information and the response document;

transmitting the response document based on the contact information to a recipient;

responsive to receiving response data from the recipient, matching the response data with the source document using the document identifier;

electronically merging the response data with the source document to yield a merged document; and processing the merged document.

2. The computer program product of claim 1 wherein said determining whether the source document includes one or more fields that require additional data comprises:

determining whether data from the source document is missing; and removing the source document from a workflow process.

3. The computer program product of claim 1 wherein said determining whether a source document with contact information includes one or more fields requiring data comprises:

determining whether the source document comprises invalid data for a required field; and removing the source document from a workflow process.

4. The computer program product of claim 1 wherein the code is further adapted to perform the following:

automatically storing the source document in a knowledge base.

5. The computer program product of claim 1 wherein the code is further adapted to perform the following:

determining whether the source document comprises one or more of a mailing address, an e-mail address and a facsimile number;

if the source document comprises an e-mail address,
assigning the e-mail address to be the contact information;

if the source document comprises a facsimile number and no e-mail address,
assigning the facsimile number to be the contact information; and if the source document comprises a mailing address and no facsimile number and no e-mail address,
assigning the mailing address to be the contact information.

6. The computer program product of claim 1 wherein said matching the response data with the source document using the document identifier comprises:

retrieving the response data to determine the document identifier; and determining whether the document identifier associated with the response data corresponds to the document identifier associated with the first document.

7. The computer program product of claim 1 wherein said automatically generating a document identifier comprises:

determining whether the contact information comprises one or more of the following: a mailing address, an e-mail address and a facsimile number;

if the contact information comprises an e-mail address:
associating the e-mail address with the document identifier, and
placing the response document in an e-mail queue;

if the contact information comprises a mailing address:
associating one or more of a barcode, a letter, a symbol and a number with the document identifier,
associating the document identifier with the source document,
printing the document identifier on the response document, and
placing the response document in a mailing queue; and if the contact information comprises a facsimile number:
associating the facsimile number with the document identifier, and
placing the response document in a facsimile queue.

8. The computer program product of claim 1 wherein the code is further adapted to perform the following:

reconciling the response data with the source document by comparing the response data with the one or more fields requiring data.

9. The computer program product of claim 1 wherein the code is further adapted to perform the following:

scanning the source document to obtain the contact information.

10. The computer program product of claim 1 wherein the code is further adapted to perform the following:

producing one or more prints based on data provided in the source document and the response document.

11. The computer program product of claim 1 wherein the code is further adapted to perform the following:

displaying a representation of the merged document.

12. A system for automatic return letter generation, the system comprising:

a processor;

a computer-readable storage medium in communication with the processor;

wherein the computer-readable storage medium contains one or more programming instructions that instruct the processor to:

determine whether a source document with contact information includes one or more fields requiring data;

responsive to the determining, automatically generate a response document based on the required data;

automatically generate a document identifier based on the contact information and the response document;

transmit the response document based on the contact information to a recipient;

responsive to receiving response data from the recipient, match the response data with the source document using the document identifier;

electronically merge the response data with the source document to yield a merged document; and display a representation of the merged document.

13. The system of claim 12 wherein the one or more programming instructions that instruct the processor to determine whether the source document with contact information includes one or more fields requiring data comprise one or more programming instructions that instruct the processor to:

determine whether data from the source document is missing, and remove the source document from a workflow process.

14. The system of claim 12 wherein the one or more programming instructions that instruct the processor to determine whether the source document with contact information includes one or more fields requiring data comprises one or more programming instructions that instruct the processor to:

determine whether the source document comprises invalid data for a required field; and remove the source document from a workflow process.

15. The system of claim 12 wherein the computer-readable storage medium further contains one or more programming instructions that instruct the processor to:

automatically store the source document in a knowledge base.

16. The system of claim 12 wherein the computer-readable storage medium further contains one or more programming instructions that instruct the processor to:

determine whether the source document comprises one or more of a mailing address, an e-mail address and a facsimile number, if the source document comprises an e-mail address, assign the e-mail address to be the contact information, if the source document comprises a facsimile number and no e-mail address, assign the facsimile number to be the contact information, and if the source document comprises a mailing address and no facsimile number and no e-mail address, assign the mailing address to be the contact information.

17. The system of claim 12 wherein the computer-readable storage medium further contains one or more programming instructions that instruct the processor to:
  reconcile the response data with the source document by comparing the response data with the one or more fields requiring data.

18. The system of claim 12 wherein the computer-readable storage medium further contains one or more programming instructions that instruct the processor to:
  produce one or more prints based on data provided in the source document and the response document.

19. A system for automatic return letter generation, the system comprising:
  a processor;
  a computer-readable storage medium in communication with the processor;
  wherein the computer-readable storage medium contains one or more programming instructions that instruct the processor to:
    determine whether a source document with contact information includes one or more fields requiring data;
    responsive to the determining, automatically generate a response document based on the required data;
    automatically generate a document identifier based on the contact information and the response document;
    transmit the response document based on the contact information to a recipient;
    responsive to receiving response data from the recipient, match the response data with the source document using the document identifier;
    electronically merge the response data with the source document to yield a merged document; and
    produce one or more prints based on data provided in the source document and the response document.

20. The system of claim 19, wherein the computer-readable storage medium further contains one or more programming instructions that instruct the processor to:
  reconcile the response data with the source document by comparing the response data with the one or more fields requiring data.

\* \* \* \* \*